United States Patent Office.

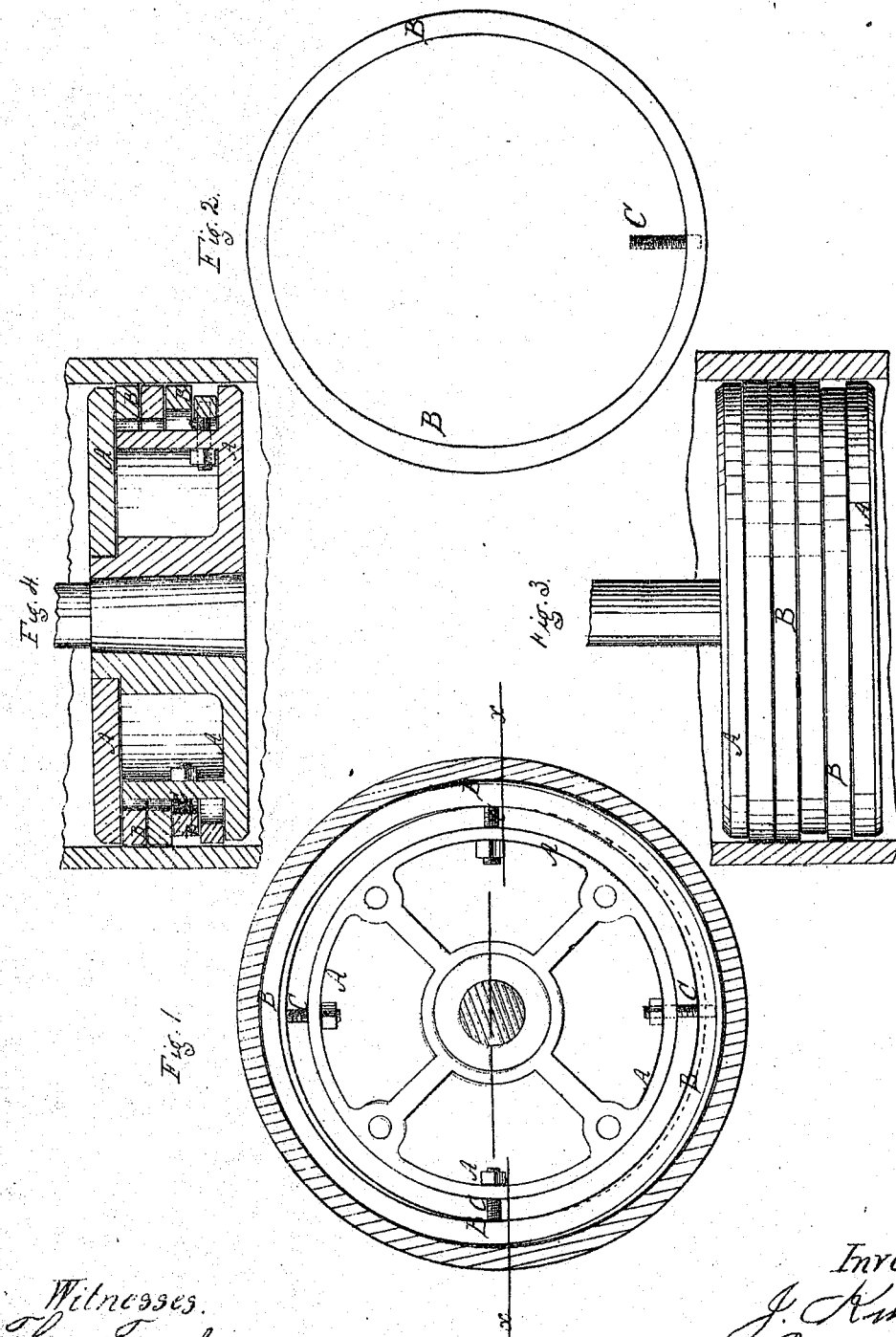

JULIUS KING, OF HOBOKEN, NEW JERSEY.

Letters Patent No. 75,927, dated March 24, 1868.

IMPROVEMENT IN PISTON-PACKING.

*The Schedule referred to in these Letters Patent and making part of the same.*

TO ALL WHOM IT MAY CONCERN:

Be it known that I, JULIUS KING, of Hoboken, in the county of Hudson, and State of New Jersey, have invented a new and improved Piston-Packing; and I do hereby declare that the following is a full, clear, and exact description thereof, which will enable others skilled in the art to make and use the same, reference being had to the accompanying drawings, forming part of this specification, in which—

Figure 1 represents a face view of my improved piston-packing.
Figure 2 is a detail face view of one of the rings.
Figure 3 is an edge view of the packing-rings.
Figure 4 is a central sectional view of the same.

Similar letters of reference indicate corresponding parts.

This invention relates to a new piston-packing of that class in which metallic packing-rings are used; and the invention consists in the packing-rings arranged around the piston, but which are not cut. Each ring is connected with the piston by means of a screw-bolt, or other equivalent device, by which the ring may be drawn towards the piston; thereby that part of the ring which is opposite to such screw is forced against the inside of the cylinder, and will fit tightly against the same. The screws on the various rings are fitted on various parts of the periphery of the piston, so that, when a number of such rings are employed, a portion of each will be forced against a separate side of the cylinder, and by all the rings together, the whole circle pressing against the cylinder will be completed, and the packing will consequently be perfectly tight. The rings will be their own springs, to adjust themselves to inequalities in the inside of the cylinder.

As each ring, when thus pressed against the cylinder, can be made to bear against more than one-half the circumference of the inside of the cylinder, it is evident that two rings may be sufficient. However, I would prefer to use more than two. It may also be found advisable to make those parts of the rings which receive the screw-bolt, or its equivalent, and which are, by the action of the bolt, or its equivalent, pressed against the inside of the cylinder, thinner than the parts between. The thinner parts of the rings will thus be made more elastic, while the thicker parts become less elastic, and consequently less liable to wear the cylinder oval, or otherwise untrue. The inner peripheries of the rings thus made need not be turned, as the ordinary split rings have to be, and a considerable saving in the manufacture of the article is thus produced.

This invention is of great practical value, as it attains the useful results of a spring-packing without the necessity of auxiliary springs, the rings alone performing the functions of both rings and springs, and, as the number of rings to be used is not limited, there may be as many points of application of the spring-pressure as there are in any spring-packing now in use. By dispensing with auxiliary springs, I am enabled to construct my packing at a less cost than the spring-packing in use. There is also a less number of parts to be kept in order, and there is less liability to get out of order, which is a matter of great importance in locomotive-engines, which are subject to incessant jars and strains.

A represents a piston of ordinary or suitable construction, having a grooved edge, as shown in fig. 4. In this groove are arranged four or more rings, B B, made of steel or any other suitable material, their outer diameters being about the same as the inner diameter of the cylinder. Each of these rings is connected with the piston by means of a bolt or screw, C, or by any other equivalent devices, by which a portion of the ring may be drawn towards the piston, and that part of it which is opposite to the screw will be forced out against the inside of the cylinder. By this action of the screws the rings become somewhat compressed, and that side which is opposite the screw will be pressed tight against the side of the cylinder, as is clearly indicated in fig. 1. In figs. 1 and 2 it is shown that the ring may be made stronger at the sides which are between the drawn-in and the pressed-out parts of the ring; but, if desired, the inner and outer edges of the rings may be made of other irregular form or shape, or even quite concentric, as may be found to be advantageous. The rings can easily be made tight upon each other. The packing-rings cannot be over-tightened, as more than or at least one-quarter of the circumference of each ring is spring.

The ordinary method of packing is split rings, with interior rings; the steam can always escape between the rings, and a great expense is incurred by turning the insides of the rings to make the inner ring fit well in them. Two uncut rings, B B, may be used, but as they have a tendency to wear the cylinder elliptical, I prefer to use four or more.

I claim as new, and desire to secure by Letters Patent—

A piston-packing, composed of four or more uncut rings, B B, each secured to the piston by means of a screw, C, or its equivalent, and all made and operating substantially in the manner herein shown and described, the rings having either perfectly concentric or irregular inner edges, as set forth.

JULIUS KING.

Witnesses:
 A. V. BRIESEN,
 ALEX. F. ROBERTS.